(12) United States Patent
Sato et al.

(10) Patent No.: US 9,850,380 B2
(45) Date of Patent: Dec. 26, 2017

(54) POLYAMIDE RESIN COMPOSITION FOR MOLDED ARTICLE EXPOSED TO HIGH-PRESSURE HYDROGEN AND MOLDED ARTICLE MADE OF THE SAME

(71) Applicant: Toray Industries, Inc., Tokyo (JP)

(72) Inventors: Daisuke Sato, Ichihara (JP); Shinichiro Ochiai, Nagoya (JP); Sadayuki Kobayashi, Nagoya (JP)

(73) Assignee: Toray Industries, Inc. (JP)

( * ) Notice: Subject to any disclaimer, the term of this patent is extended or adjusted under 35 U.S.C. 154(b) by 19 days.

(21) Appl. No.: 15/302,635

(22) PCT Filed: Oct. 26, 2015

(86) PCT No.: PCT/JP2015/080093
§ 371 (c)(1),
(2) Date: Oct. 7, 2016

(87) PCT Pub. No.: WO2016/136025
PCT Pub. Date: Sep. 1, 2016

(65) Prior Publication Data
US 2017/0029620 A1 Feb. 2, 2017

(30) Foreign Application Priority Data
Feb. 27, 2015 (JP) .................. 2015-037934

(51) Int. Cl.
*F17C 1/02* (2006.01)
*C08L 77/02* (2006.01)
(Continued)

(52) U.S. Cl.
CPC .............. *C08L 77/02* (2013.01); *B32B 27/34* (2013.01); *C08J 5/00* (2013.01); *C08L 23/26* (2013.01);
(Continued)

(58) Field of Classification Search
CPC ...... C08L 77/02; C08L 23/0815; C08L 23/26; C08L 77/06; C08L 2205/025; C08J 5/00;
(Continued)

(56) References Cited

U.S. PATENT DOCUMENTS

| 5,612,105 A | 3/1997 | Okamoto et al. |
| 6,855,755 B1 * | 2/2005 | Morimoto ................ C08K 5/13 524/105 |

(Continued)

FOREIGN PATENT DOCUMENTS

| JP | 8-47972 A | 2/1996 |
| JP | 2003-105095 A | 4/2003 |

(Continued)

*Primary Examiner* — Kareen Thomas
(74) *Attorney, Agent, or Firm* — DLA Piper LLP (US)

(57) ABSTRACT

A polyamide resin composition for a molded article exposed to high-pressure hydrogen contains a polyamide 6 resin (A) and a polyamide resin (B) having a melting point, as determined by DSC, that is not higher than a melting point of the polyamide 6 resin (A) +20° C. and a cooling crystallization temperature, as determined by DSC, that is higher than a cooling crystallization temperature of the polyamide 6 resin (A), the polyamide resin (B) present in an amount of 0.01 to 5 parts by weight based on 100 parts by weight of the polyamide 6 resin (A). The polyamide resin composition can provide a molded article having excellent weld properties and is less likely to suffer failure points despite repeated charging and discharging of high-pressure hydrogen.

9 Claims, 1 Drawing Sheet

(51) Int. Cl.
*C08L 23/26* (2006.01)
*C08L 77/06* (2006.01)
*F17C 1/16* (2006.01)
*B32B 27/34* (2006.01)
*C08J 5/00* (2006.01)
*F17C 13/04* (2006.01)

(52) U.S. Cl.
CPC ............... *C08L 77/06* (2013.01); *F17C 1/16* (2013.01); *F17C 13/04* (2013.01); *B32B 2439/00* (2013.01); *C08J 2377/02* (2013.01); *C08J 2477/06* (2013.01); *C08L 2205/025* (2013.01); *F17C 2203/0604* (2013.01); *F17C 2203/066* (2013.01); *F17C 2203/0675* (2013.01); *F17C 2205/0323* (2013.01); *F17C 2221/012* (2013.01); *F17C 2270/0184* (2013.01)

(58) Field of Classification Search
CPC .... C08J 2477/06; C08J 2377/02; F17C 13/04; F17C 1/16; F17C 2221/012; F17C 2203/0675; F17C 2203/066; F17C 2203/0604; F17C 2270/0184; F17C 2205/0323; B32B 27/34; B32B 2439/00
USPC .......... 220/581–592, 62.11–62.22; 524/538, 524/133, 100, 232, 514; 523/400, 351; 264/322
See application file for complete search history.

(56) References Cited

U.S. PATENT DOCUMENTS

| | | | |
|---|---|---|---|
| 9,109,750 B2* | 8/2015 | Okawachi | F17C 5/06 |
| 2005/0059767 A1 | 3/2005 | Saito et al. | |
| 2009/0203845 A1 | 8/2009 | Fukui et al. | |
| 2010/0273944 A1* | 10/2010 | Kobayashi | B29C 47/0021 525/55 |
| 2010/0294776 A1* | 11/2010 | Liu | B60K 15/03006 220/562 |
| 2011/0021707 A1* | 1/2011 | Kobayashi | B29B 7/42 525/190 |
| 2013/0338260 A1* | 12/2013 | Center | C08L 77/06 523/351 |
| 2013/0338263 A1* | 12/2013 | Tao | C08L 77/06 523/400 |
| 2013/0338274 A1* | 12/2013 | Center | C08K 13/02 524/100 |
| 2014/0034654 A1 | 2/2014 | Dullaert et al. | |
| 2015/0159806 A1* | 6/2015 | Nettis | F17C 1/00 220/562 |

FOREIGN PATENT DOCUMENTS

| | | |
|---|---|---|
| JP | 2003-197085 A | 7/2003 |
| JP | 2005-54087 A | 3/2005 |
| JP | 2007-204674 A | 8/2007 |
| JP | 2009-191871 A | 8/2009 |
| JP | 2012-62417 A | 3/2012 |
| JP | 2013-227556 A | 11/2013 |
| JP | 2014-501818 A | 1/2014 |

* cited by examiner

Elapsed time since the start of cooling (sec)

Elapsed time since the start of cooling (sec)

POLYAMIDE RESIN COMPOSITION FOR MOLDED ARTICLE EXPOSED TO HIGH-PRESSURE HYDROGEN AND MOLDED ARTICLE MADE OF THE SAME

TECHNICAL FIELD

This disclosure relates to a polyamide resin composition for a molded article exposed to high-pressure hydrogen, the composition comprising a polyamide 6 resin and a specific amount of a specific polyamide resin, and to a molded article made of the composition.

BACKGROUND

Fuel-cell electric vehicles, which are equipped with fuel cells that generate electricity by electrochemical reaction of hydrogen with oxygen in the air, the electricity generated by the fuel cells being supplied to motors and used as driving force, have recently been receiving attention as countermeasures against the depletion of petroleum fuel and the demand for reductions in toxic gas emission. Resin tanks including resin liners, the outsides of which are reinforced with carbon-fiber-reinforced plastics, have been studied as tanks for high-pressure hydrogen to be mounted on automobiles. Conventional resin tanks, however, disadvantageously undergo deformation or breakage with repeated charging and discharging of high-pressure hydrogen. This is because hydrogen, for its small molecular size, readily permeates through the resins as compared, for example, to natural gas, which has a relatively large molecular size, and high-pressure hydrogen, as compared to hydrogen at atmospheric pressure, may be accumulated in the resins in larger amounts.

For example, a hydrogen tank liner material comprising a polyamide resin composition containing a polyamide 6, a copolyamide, and an impact modifier is disclosed as a hydrogen tank liner material having excellent gas barrier properties and high impact resistance at low temperatures (see JP 2009-191871 A, for example).

For example, a polyamide resin composition comprising a polyamide 6 resin, a polyamide 610 resin, an ethylenic ionomer resin, and an ethylenic copolymer elastomer resin is disclosed as a polyamide resin composition suitable for use for fuel tanks, fuel delivery pipes, and other applications and having so excellent blow molding properties and low-temperature toughness that are suitable for hollow blow molding (see JP 2007-204674 A, for example).

For example, a gas storage tank liner comprising a polyamide, a nucleating agent, and a polymer composition containing an impact resistance modifier is disclosed as a gas storage tank liner having excellent gas barrier properties (see JP 2014-501818 A, for example).

Molded articles exposed to high-pressure hydrogen are produced, for example, by injection molding. In injection-molded articles produced by multipoint gate systems or metallic insert systems and injection-molded articles having structural ribs or openings, fragile portions called welds tend to be formed at portions in a mold where molten resin flows meet. At welds, V-shaped grooves called weld lines may be formed due to adhesion failure, resulting in poor appearances. In addition, strength and toughness may be reduced due to stress concentrations (notch effects). Thus, high weld properties are required in designing molded articles.

The hydrogen tank liner disclosed in JP 2009-191871 A, however, has disadvantages in that permeation of hydrogen gas and absorption of hydrogen into the resin are likely to occur, and the hydrogen tank liner suffers failure points with repeated charging and discharging of high-pressure hydrogen. In addition, the polyamide resins have low compatibility, and the weld properties are poor.

The resin composition disclosed in JP 2007-204674 A, although having excellent low-temperature toughness, has disadvantages in that permeation of hydrogen gas and absorption of hydrogen into the resin are likely to occur, and the hydrogen tank liner suffers failure points with repeated charging and discharging of high-pressure hydrogen. In addition, the polyamide resins have low compatibility, and the weld properties are poor.

The gas storage tank liner disclosed in JP 2014-501818 A, although having excellent resistance to helium gas permeation, has disadvantages in that permeation of hydrogen gas and absorption of hydrogen into the resin are likely to occur, and the hydrogen tank liner suffers failure points with repeated charging and discharging of high-pressure hydrogen. In addition, the dispersibility of the nucleating agent in the polyamide and the adhesion of the polyamide to the nucleating agent are low, and the weld properties are poor.

It could therefore be helpful to provide a polyamide resin composition that can provide a molded article having excellent weld properties and less likely to suffer failure points despite repeated charging and discharging of high-pressure hydrogen.

SUMMARY

We thus provide:

A polyamide resin composition for a molded article exposed to high-pressure hydrogen, the composition comprising a polyamide 6 resin (A) and a polyamide resin (B) having a melting point, as determined by DSC, that is not higher than a melting point of the polyamide 6 resin (A) +20° C. and a cooling crystallization temperature, as determined by DSC, that is higher than a cooling crystallization temperature of the polyamide 6 resin (A), the polyamide resin (B) being in an amount of 0.01 to 5 parts by weight based on 100 parts by weight of the polyamide 6 resin (A).

A molded article exposed to high-pressure hydrogen comprises the above-described polyamide resin composition.

A tank liner for high-pressure hydrogen comprises the above-described polyamide resin composition.

A tank for high-pressure hydrogen comprises a tank liner comprising the above-described polyamide resin composition and a carbon-fiber-reinforced-plastic reinforcement layer laminated on a surface of the tank liner.

The polyamide resin composition for a molded article exposed to high-pressure hydrogen crystallizes fast and can provide a molded article having excellent weld properties and less likely to suffer failure points despite repeated charging and discharging of high-pressure hydrogen. The molded article, for its excellent weld properties and unlikeliness to suffer failure points despite repeated charging and discharging of high-pressure hydrogen, can be advantageously used as a molded article used in applications exposed to high-pressure hydrogen.

DESCRIPTION OF SYMBOL

1: Invariant Q rising time

DETAILED DESCRIPTION

Figure 1A:
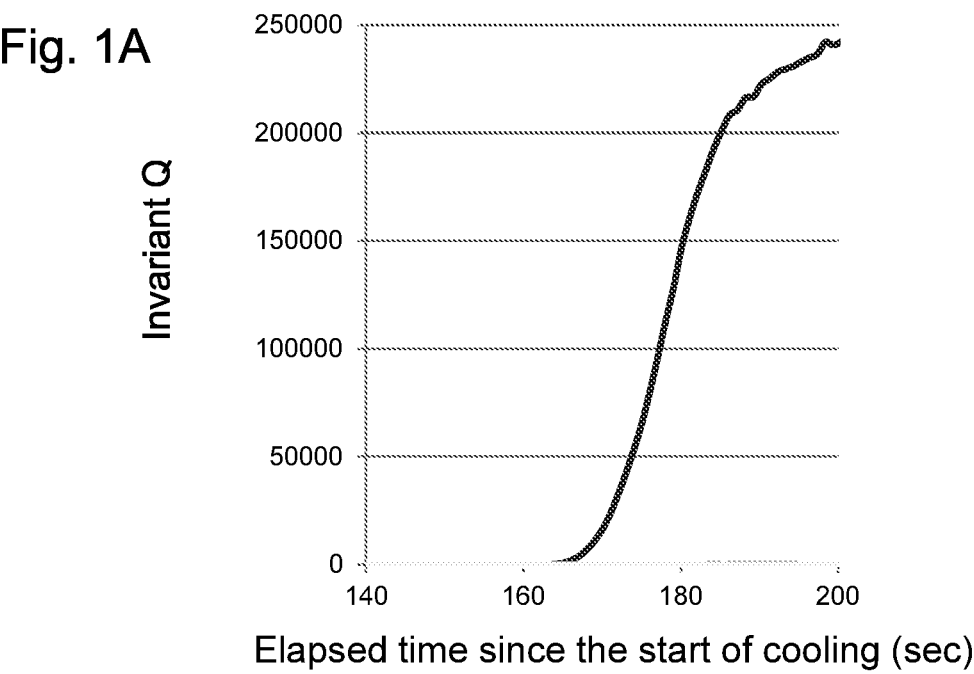
FIGS. 1A and 1B show graphs of the results of a measurement of the invariant Q of the polyamide resin composition obtained in Example 4.

The polyamide resin composition for a molded article exposed to high-pressure hydrogen (hereinafter also referred to as "the polyamide resin composition") comprises a polyamide 6 resin (A) and a polyamide resin (B) having a melting point, as determined by DSC, that is not higher than a melting point of the polyamide 6 resin (A) +20° C. and a cooling crystallization temperature, as determined by DSC, that is higher than a cooling crystallization temperature of the polyamide 6 resin (A), the polyamide resin (B) being in an amount of 0.01 to 5 parts by weight based on 100 parts by weight of the polyamide 6 resin (A). Combining the polyamide 6 resin (A), which has an excellent balance of moldability, gas barrier properties, rigidity, and toughness, with the polyamide resin (B) in a specific amount leads to an increased crystallization rate and formation of fine and uniform crystals. This can reduce permeation of hydrogen gas and absorption of hydrogen into the resin, and thus failure points are unlikely to occur despite repeated charging and discharging of high-pressure hydrogen. In addition, formation of fine and uniform crystals leads to improved adhesion of a molten resin at welds to provide a molded article with excellent weld properties such as weld strength and weld toughness. By contrast, a combination of the polyamide 6 resin (A) with an organic nucleating agent or an inorganic nucleating agent other than the polyamide (B), although increasing the crystallization rate, does not form so fine and uniform crystals as in the case of using the polyamide resin (B), leading to reduced weld properties and an increased likelihood that failure points occur with repeated charging and discharging of high-pressure hydrogen.

The polyamide 6 resin (A) is a polyamide resin composed mainly of 6-aminocaproic acid and/or ε-caprolactam. Other monomers may be copolymerized to the extent that the desired effect is not adversely affected. "Composed mainly of" means that units derived from 6-aminocaproic acid or units derived from ε-caprolactam are contained in a total amount of 50 mol % or more based on 100 mol % of total monomer units constituting the polyamide resin. The units derived from 6-aminocaproic acid or the units derived from ε-caprolactam are more preferably contained in an amount of 70 mol % or more, still more preferably 90 mol % or more.

Examples of other monomers to be copolymerized include amino acids such as 11-aminoundecanoic acid, 12-aminododecanoic acid, and p-aminomethylbenzoic acid; lactams such as ω-laurolactam; aliphatic diamines such as tetramethylenediamine, pentamethylenediamine, hexamethylenediamine, 2-methylpentamethylenediamine, undecamethylenediamine, dodecamethylenediamine, 2,2,4-/2,4,4-trimethylhexamethylenediamine, and 5-methylnonamethylenediamine; aromatic diamines such as m-xylenediamine and p-xylylenediamine; alicyclic diamines such as 1,3-bis(aminomethyl) cyclohexane, 1,4-bis(aminomethyl) cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, 1,2-cyclohexanedicarboxylic acid, and 1,3-cyclopentanedicarboxylic acid. Two or more of these monomers may be copolymerized.

The polyamide 6 resin (A) may have any degree of polymerization but preferably has a relative viscosity, as measured at 25° C. in a 98% concentrated sulfuric acid solution at a resin concentration of 0.01 g/ml, of 1.5 to 7.0. A relative viscosity of 1.5 or more leads to a moderately high melt viscosity of the polyamide resin composition during molding, which can reduce air entrapment during molding to further improve the moldability. The relative viscosity is more preferably 1.8 or more. A relative viscosity of 7.0 or less leads to a moderately low melt viscosity of the polyamide resin composition during molding, which can further improve the moldability.

The amount of terminal amino group of the polyamide resin (A) is preferably, but not necessarily, 1.0 to $10.0 \times 10^{-5}$ mol/g. The amount of terminal amino group of 1.0 to $10.0 \times 10^{-5}$ mol/g can provide a sufficient degree of polymerization and a molded article with improved mechanical strength. The amount of terminal amino group of the polyamide resin (A) can be determined by dissolving the polyamide resin (A) in a mixed solvent of phenol and ethanol (83.5:16.5 (volume ratio)) and titrating the resulting solution using a 0.02N aqueous hydrochloric acid solution.

The polyamide resin (B) is a polyamide resin having a melting point, as determined by DSC, that is not higher than a melting point of the polyamide 6 resin (A) +20° C. and a cooling crystallization temperature, as determined by DSC, that is higher than a cooling crystallization temperature of the polyamide 6 resin (A).

The melting point and the cooling crystallization temperature, as determined by DSC, of the polyamide 6 resin (A) and the polyamide resin (B) can be determined by the following method. First, two-point calibration (indium, lead) and baseline subtraction are performed using a differential scanning calorimeter (DSC-7 available from PerkinElmer Inc). A sample in an amount of 8 to 10 mg is heated at a rate of 20° C./min, held for one minute at a temperature 15° C. higher than the temperature at the peak of a melting curve obtained, and then cooled to 30° C. at a rate of 20° C./min. The crystallization exothermic peak temperature observed during the cooling step is used as a cooling crystallization temperature. After the sample is held at 30° C. for one minute, a second heating step is performed in the same manner as the first heating step, at a rate of 20° C./min. The melting endothermic peak temperature observed during the second heating step is used as a melting point.

A melting point of the polyamide resin (B) higher than the melting point of the polyamide 6 resin (A) by over 20° C. leads to low dispersibility of the polyamide resin (B) in the polyamide resin composition, resulting in a reduced crystallization-rate-improving effect and an increased likelihood that failure points occur with repeated charging and discharging of high-pressure hydrogen. The melting point of the polyamide resin (B) is preferably not higher than the melting point of the polyamide 6 resin (A) +15° C., more preferably not higher than the melting point +12° C., still more preferably not higher than the melting point +10° C. A melting point of the polyamide resin (B) not higher than the melting point of the polyamide 6 resin (A) +10° C. reduces the temperature range in which the polyamide 6 resin (A) and the polyamide resin (B) are solid-liquid separated, leading to an increased crystallization rate. The melting point of the polyamide resin (B) is preferably, but not necessarily, higher than the melting point of the polyamide 6 resin (A) by at least 1° C. In this range, the cooling crystallization temperature of the polyamide resin (B) tends to be in the preferred range described below.

If the cooling crystallization temperature of the polyamide resin (B) is not higher than the cooling crystallization temperature of the polyamide 6 resin (A), the polyamide 6 resin (A) crystallizes faster than the polyamide resin (B) during the process of cooling the polyamide resin composition in a molten state. Consequently, fine and uniform crystals are not formed, leading to reduced weld properties and an increased likelihood that failure points occur with repeated charging and discharging of high-pressure hydrogen. The cooling crystallization temperature of the polyamide resin (B) is preferably higher than the cooling crystallization temperature of the polyamide 6 resin (A) by at least 1° C., more preferably by at least 3° C., still more preferably by at least 5° C. If the cooling crystallization temperature of the polyamide resin (B) is higher than the cooling crystallization temperature of the polyamide 6 resin (A) by at least 5° C., the crystallization of the polyamide resin (B) occurs significantly earlier than the crystallization of the polyamide 6 resin (A) during the process of cooling the polyamide 6 resin (A) and the polyamide resin (B) in a molten state. Consequently, the polyamide resin (B) functions so effectively as a crystallization accelerator that fine and uniform crystals tend to be formed, failure points are unlikely to occur despite repeated charging and discharging of high-pressure hydrogen, and weld properties are improved. The cooling crystallization temperature of the polyamide resin (B) is preferably not higher than the melting point of the polyamide 6 resin (A) +20° C., more preferably not higher than the melting point +15° C., still more preferably not higher than the melting point +10° C. A cooling crystallization temperature of the polyamide resin (B) not higher than the melting point of the polyamide 6 resin (A) +20° C. can produce the desired effects while maintaining the melt stability of the polyamide 6 resin (A) in producing the polyamide resin composition.

The melting point and the cooling crystallization temperature of the polyamide resin (B) can be controlled to be in the ranges described above, for example, by selecting a polyamide resin having a desired melting point and a desired cooling crystallization temperature from polyamide resins having different melting points and cooling crystallization temperatures or controlling the conditions such as the degree of polymerization and the copolymerization ratio.

The polyamide resin (B) may be any polyamide resin that has a melting point and a cooling crystallization temperature satisfying the conditions described above and can typically be obtained using amino acids, lactams, or diamines and dicarboxylic acids as main materials. Typical examples of the materials include amino acids such as 6-aminocaproic acid, 11-aminoundecanoic acid, 12-aminododecanoic acid, and p-aminomethylbenzoic acid; lactams such as ε-caprolactam and ω-laurolactam; aliphatic diamines such as tetramethylenediamine, pentamethylenediamine, hexamethylenediamine, 2-methylpentamethylenediamine, undecamethylenediamine, dodecamethylenediamine, 2,2,4-/2,4,4-trimethylhexamethylenediamine, and 5-methylnonamethylenediamine; aromatic diamines such as m-xylenediamine and p-xylylenediamine; alicyclic diamines such as 1,3-bis(aminomethyl) cyclohexane, 1,4-bis(aminomethyl) cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, 1,2-cyclohexanedicarboxylic acid, and 1,3-cyclopentanedicarboxylic acid. Polyamide homopolymers or copolymers derived from these materials can be used. Two or more of these polyamide resins may be used.

Specific examples of the polyamide resin (B) include polyhexamethylene sebacamide (polyamide 610) and copolymers of one or more selected from polyhexamethylene adipamide (polyamide 66), polypentamethylene adipamide (polyamide 56), polytetramethylene adipamide (polyamide 46), and polytetramethylene sebacamide (polyamide 410) and one or more selected from polycaproamide (polyamide 6), polyundecaneamide (polyamide 11), polydodecaneamide (polyamide 12), polyhexamethylene sebacamide (polyamide 610), polypentamethylene sebacamide (polyamide 510), and polyhexamethylene dodecamide (polyamide 612). Of these, polyamide 610 is more preferred to further improve the weld properties.

The polyamide resin (B) may have any degree of polymerization but preferably has a relative viscosity, as measured at 25° C. in a 98% concentrated sulfuric acid solution at a resin concentration of 0.01 g/ml, of 1.5 to 7.0. A relative viscosity of 1.5 or more leads to a moderately high melt viscosity of the polyamide resin composition during molding, which can reduce air entrapment during molding to further improve the moldability. The relative viscosity is more preferably 1.8 or more. A relative viscosity of 7.0 or less leads to a moderately low melt viscosity of the polyamide resin composition during molding, which can further improve the moldability.

The amount of terminal amino group of the polyamide resin (B) is preferably, but not necessarily, 1.0 to $10.0 \times 10^{-5}$ mol/g. The amount of terminal amino group of 1.0 to $10.0 \times 10^{-5}$ mol/g can provide a sufficient degree of polymerization and a molded article with improved mechanical strength. The amount of terminal amino group of the polyamide resin (B) can be determined by dissolving the polyamide resin (B) in a mixed solvent of phenol and ethanol (83.5:16.5 (volume ratio)) and titrating the resulting solution using a 0.02N aqueous hydrochloric acid solution.

The amount of the polyamide resin (B) in the polyamide resin composition is 0.01 to 5 parts by weight based on 100 parts by weight of the polyamide 6 resin (A). If the amount of the polyamide resin (B) is less than 0.01 part by weight, a sufficient crystallization-rate-improving effect cannot be produced, and failure points are likely to occur with repeated charging and discharging of high-pressure hydrogen. In addition, fine and uniform crystals are unlikely to be formed, leading to reduced weld properties. The amount of the polyamide resin (B) is preferably 0.05 part by weight or more, more preferably 0.1 part by weight or more. If the amount of the polyamide resin (B) is more than 5 parts by weight, the phase separation of the polyamide 6 resin (A) and the polyamide resin (B) is facilitated during the process of cooling the resin composition in a molten state. Thus, a sufficient crystallization-rate-improving effect cannot be produced, and failure points are likely to occur with repeated charging and discharging of high-pressure hydrogen. In addition, fine and uniform crystals are unlikely to be formed, leading to reduced weld properties. The amount of the polyamide resin (B) is preferably 4.5 parts by weight or less, more preferably 4 parts by weight or less.

Preferably, the polyamide resin composition further contains an impact modifier (C). The impact modifier (C) can improve shock resistance. Molded articles used in applications exposed to high-pressure hydrogen are subject to repeated temperature changes (heat cycles) from −40° C. or lower to 90° C. or higher due to charging and discharging of high-pressure hydrogen and, thus, in the case, for example, of a composite article having a resin portion and a metal portion, cracks tend to occur at the joint between the resin portion and the metal portion. The impact modifier (C) can prevent such cracks that may occur at the joint between the resin portion and the metal portion due to repeated heat cycles and can improve heat cycle resistance.

Examples of the impact modifier (C) include olefin resins, acrylic rubber, silicone rubber, fluorine rubber, styrene rubber, nitrile rubber, vinyl rubber, urethane rubber, polyamide elastomers, polyester elastomers, and ionomers. Two or more of these may be used.

Of these, olefin resins, which have high compatibility with the polyamide 6 resin (A) and the polyamide resin (B) and effectively improve heat cycle resistance, are suitable for use. Olefin resins are thermoplastic resins obtained through the polymerization of olefin monomers such as ethylene, propylene, butene, isoprene, and pentene. Copolymers of two or more olefin monomers may also be used, and copolymers of these olefin monomers and other monomers may also be used. Specific examples of olefin resins include polymers such as polyethylene, polypropylene, polystyrene, poly(1-butene), poly(1-pentene), and polymethylpentene, and copolymers thereof; and ethylene/α-olefin copolymers, ethylene/α,β-unsaturated carboxylate copolymers, α-olefin/α,β-unsaturated carboxylate copolymers, polyolefins obtained by hydrolyzing at least a portion of a copolymer of (ethylene and/or propylene) and a vinyl alcohol ester, copolymers of (ethylene and/or propylene) and (unsaturated carboxylic acid and/or unsaturated carboxylate), polyolefins obtained by substituting at least some of carboxyl groups of copolymers of (ethylene and/or propylene) and (unsaturated carboxylic acid and/or unsaturated carboxylate) with metal ions, block copolymers of conjugated dienes and vinyl aromatic hydrocarbons, and hydrides thereof. Of these, ethylene/α-olefin copolymers and ethylene/α,β-unsaturated carboxylate copolymers are more preferred, and ethylene/α-olefin copolymers are still more preferred.

The above-described polyolefin resins each may be modified with an unsaturated carboxylic acid and/or a derivative thereof. The derivative of an unsaturated carboxylic acid is an unsaturated carboxylic acid compound having a carboxyl group whose hydroxy moiety is substituted, and examples include metal salts, acid halides, esters, acid anhydrides, amides, and imides of unsaturated carboxylic acids. Such a modified polyolefin resin can further improve the compatibility with the polyamide 6 resin (A) and the polyamide resin (B), leading to further improved heat cycle resistance. Examples of unsaturated carboxylic acids or derivatives thereof include acrylic acid, methacrylic acid, maleic acid, fumaric acid, itaconic acid, crotonic acid, methyl maleic acid, methyl fumaric acid, mesaconic acid, citraconic acid, glutaconic acid, and metal salts of these carboxylic acids; unsaturated carboxylates such as methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, and dimethyl itaconate; acid anhydrides such as maleic anhydride, itaconic anhydride, citraconic anhydride, endo-bicyclo-(2,2,1)-5-heptene-2,3-dicarboxylic acid, and endo-bicyclo-(2,2,1)-5-heptene-2,3-dicarboxylic anhydride; and maleimide, N-ethylmaleimide, N-butylmaleimide, N-phenylmaleimide, glycidyl acrylate, glycidyl methacrylate, glycidyl ethacrylate, glycidyl itaconate, glycidyl citraconate, and 5-norbornene-2,3-dicarboxylic acid. Of these, unsaturated dicarboxylic acids and acid anhydrides thereof are preferred, and maleic acid or maleic anhydride are particularly preferred.

These unsaturated carboxylic acids or derivatives thereof can be incorporated into the polyolefin resin, for example, by copolymerization of an olefin monomer and an unsaturated carboxylic acid and/or a derivative thereof or by graft incorporation of an unsaturated carboxylic acid and/or a derivative thereof into an unmodified polyolefin resin using a radical initiator.

Preferred ethylene/α-olefin copolymers are copolymers of ethylene and α-olefins of 3 to 20 carbon atoms. Specific examples of α-olefins of 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. Two or more of these may be used. Of these α-olefins, α-olefins of 3 to 12 carbon atoms are preferred to improve mechanical strength. Furthermore, at least one of unconjugated dienes including 1,4-hexadiene, dicyclopentadiene, 2,5-norbornadiene, 5-ethylidenenorbornene, 5-ethyl-2,5-norbornadiene, and 5-(1'-propenyl)-2-norbornene may be copolymerized. Copolymers of ethylene modified with an unsaturated carboxylic acid and/or a derivative thereof and α-olefins of 3 to 12 carbon atoms are more preferred. Such copolymers can further improve the compatibility with the polyamide 6 resin (A) and the polyamide resin (B), leading to further improved heat cycle resistance. Furthermore, failure points can be prevented from occurring even if charging and discharging of higher-pressure hydrogen is repeated. The α-olefin content of the ethylene/α-olefin copolymer is preferably 1 to 30 mol %, more preferably 2 to 25 mol %, still more preferably 3 to 20 mol %.

The impact modifier (C) may be of any structure, for example, what is called a core-shell multilayer structure including at least one layer made of rubber and one or more layers made of polymers different from the rubber. The multilayer structure may be composed of two, three, or four or more layers and preferably has at least one inner rubber layer (core layer). Examples of the rubber constituting the rubber layer of the multilayer structure include, but are not limited to, rubbers obtained by polymerizing acrylic components, silicone components, styrene components, nitrile components, conjugated diene components, urethane components, ethylene components, propylene components, isobutene components, and other components. The different polymers constituting the layers other than the rubber layer of the multilayer structure may be any polymers having thermoplasticity and are preferably polymers having glass transition temperatures higher than that of the rubber layer. Examples of polymers having thermoplasticity include polymers containing unsaturated carboxylic acid alkyl ester units, unsaturated carboxylic acid units, unsaturated-glycidyl-containing units, unsaturated dicarboxylic anhydride units, aliphatic vinyl units, aromatic vinyl units, vinyl cyanide units, maleimide units, unsaturated dicarboxylic acid units, and other vinyl units.

The amount of the impact modifier (C) in the polyamide resin composition is preferably 1 to 50 parts by weight based on 100 parts by weight of the polyamide 6 resin (A). Not less than 1 part by weight of the impact modifier (C) can further improve heat cycle resistance. The amount of the impact modifier (C) is more preferably not less than 5 parts by weight, still more preferably not less than 10 parts by weight. Not more than 50 parts by weight of the impact modifier (C) can further improve the crystallization rate. The amount of the impact modifier (C) is more preferably not more than 45 parts by weight, still more preferably not more than 40 parts by weight, yet still more preferably not more than 35 parts by weight.

To the polyamide resin composition, other components than the components (A), (B), and (C) may optionally be added to the extent that the properties of the composition are not impaired. Examples of other components include fillers, thermoplastic resins other than the components (A) to (C), and various additives.

For example, adding a filler to the polyamide resin composition as the other component can provide a molded article with improved properties such as strength and dimensional stability. The shape of the filler may be fibrous or non-fibrous, and a fibrous filler and a non-fibrous filler may be used in combination. Examples of fibrous fillers include glass fibers, glass milled fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers, and metal fibers. Examples of non-fibrous fillers include silicates such as wollastonite, zeolite, sericite, kaolin, mica, clay, pyrophyllite, bentonite, asbestos, talc, and alumina silicate; metal oxides such as alumina, silicon oxide, magnesium oxide, zirconium oxide, titanium oxide, and iron oxide; metal carbonates such as calcium carbonate, magnesium carbonate, and dolomite; metal sulfates such as calcium sulfate and barium sulfate; metal hydroxides such as magnesium hydroxide, calcium hydroxide, and aluminum hydroxide; and glass beads, ceramic beads, boron nitride, and silicon carbide. These fillers may be hollow. These fibrous fillers and/or non-fibrous fillers are preferably pretreated with coupling agents before use to provide more excellent mechanical properties. Examples of coupling agents include isocyanate compounds, organic silane compounds, organic titanate compounds, organic borane compounds, and epoxy compounds.

Examples of thermoplastic resins include polyester resins, polyphenylene sulfide resins, polyphenylene oxide resins, polycarbonate resins, polylactic resins, polyacetal resins, polysulfone resins, polytetrafluoroethylene resins, polyetherimide resins, polyamide-imide resins, polyimide resins, polyethersulfone resins, polyether ketone resins, polythioether ketone resins, polyether ether ketone resins, styrene resins such as polystyrene resins and ABS resins, and polyalkylene oxide resins. Two or more of these thermoplastic resins may be added.

Examples of various additives include anti-coloring agents, antioxidants such as hindered phenols and hindered amines, release agents such as ethylene bisstearyl amides and higher fatty acid esters, plasticizers, heat stabilizers, lubricants, ultraviolet absorbers, coloring agents, flame retardants, and blowing agents.

To the polyamide resin composition, copper compounds, which can improve long-term heat resistance, are preferably added. Examples of copper compounds include cuprous chloride, cupric chloride, cuprous bromide, cupric bromide, cuprous iodide, cupric iodide, cupric sulfate, cupric nitrate, cupric phosphate, cuprous acetate, cupric acetate, cupric salicylate, cupric stearate, cupric benzoate, and complex compounds of these copper inorganic halides with, for example, xylylenediamine, 2-mercaptobenzimidazole, and benzimidazole. Two or more of these may be added. Of these, monovalent copper compounds, in particular, monohalogenated copper compounds are preferred, and, for example, cuprous acetate and cuprous iodide are preferred. The amount of copper compound is preferably 0.01 part by weight or more, more preferably 0.015 part by weight or more, based on 100 parts by weight of the polyamide 6 resin (A). To prevent or reduce the coloring due to the release of metallic copper during molding, the amount of copper compound is preferably 2 parts by weight or less, more preferably 1 part by weight or less.

Together with the copper compounds, alkali halides may also be added. Examples of alkali halide compounds include lithium chloride, lithium bromide, lithium iodide, potassium chloride, potassium bromide, potassium iodide, sodium bromide, and sodium iodide. Two or more of these may be added. Potassium iodide or sodium iodide is particularly preferred.

The polyamide resin composition preferably has an invariant Q rising time, as determined by light scattering measurements by cooling the composition in a molten state from 250° C. at a rate of 20° C./min, that is shorter than an invariant Q rising time of the polyamide 6 resin (A) as determined under the same conditions. The invariant Q is defined as a scattering intensity I (s) integrated over the reciprocal space, as determined by light scattering measurements. In other words, the invariant Q is a value indicating the total scattering ability of a sample. The resin is molten at the start of the measurement, but as the temperature decreases, the resin crystallizes and begins to scatter light. That is to say, the invariant Q rising time is a time from the start of the measurement until the sample starts to crystallize. The invariant Q rising time is used as an indicator of the progress of crystallization (crystallization rate). The fact that the invariant Q rising time of the polyamide resin composition, as determined by the light scattering measurements by cooling the composition from 250° C. at a rate of 20° C./min, is shorter than the invariant Q rising time of the polyamide 6 resin (A) means that the cooling crystallization rate of the polyamide resin composition is higher than when the polyamide 6 resin (A) alone is used. In other words, the cooling crystallization rate is increased by adding the polyamide resin (B) to the polyamide 6 resin (A) as compared to when the polyamide 6 resin (A) alone is used. Thus, the polyamide resin composition, as compared to the polyamide 6 resin (A), is less likely to suffer failure points despite repeated charging and discharging of higher-pressure hydrogen. Furthermore, since the cooling crystallization rate is higher than that of the polyamide 6 resin (A), crystalline nuclei are uniformly formed, allowing finer and more uniform crystals to be formed and leading to further improved weld properties.

The invariant Q rising times of the polyamide resin composition and the polyamide 6 resin (A) can be determined by the following method. First, a sample in an amount of 8 to 10 mg is placed on a "CSS-450W" hot stage available from Linkam Scientific Instruments Ltd. with a coverslip thereon, and the temperature is held at 250° C. for 30 seconds to melt the sample. The temperature is then lowered to 180° C. at a rate of 20° C./min. During this process, the invariant Q rising time is determined using a "DYNA-3000" polymer film dynamic analyzer available from Otsuka Electronics Co., Ltd. under the following conditions: mode, one-dimensional scanning (1×512); X direction, four elements at the central part are integrated and counted as one data; ND filter, 5%; measurement interval, 1 sec; exposure time, 500 msec; goniometer angle, 20°; provided that the time point at the start of cooling is taken as 0. The invariant Q rising time refers to a time point at which the invariant Q starts to increase, provided that the invariant Q at the start of cooling is taken as 0.

Figure 1B:
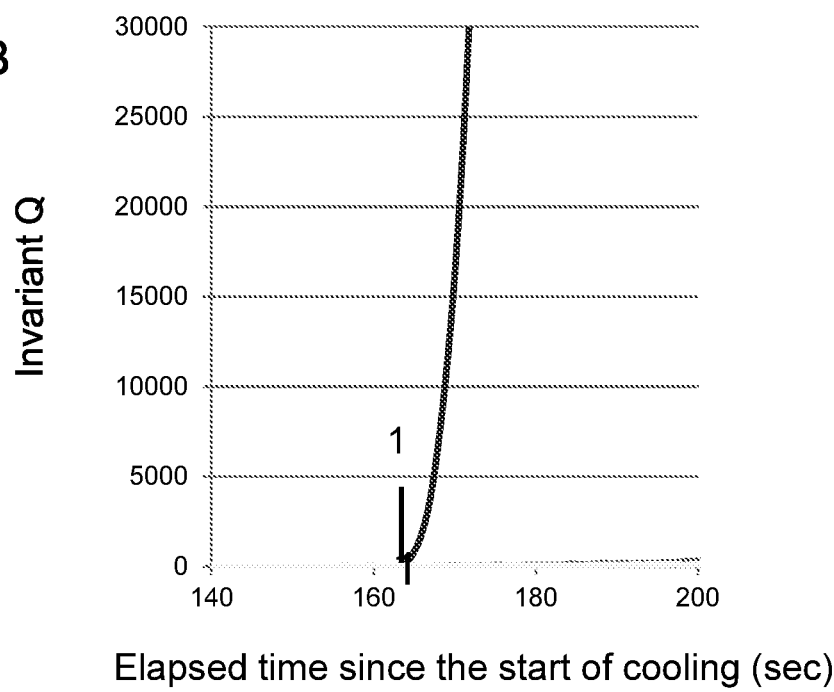

FIGS. 1A and 1B show graphs of the results of a measurement of the invariant Q of the polyamide resin composition obtained in Example 4 described below. The elapsed time since the start of cooling is taken along the abscissa, and the invariant Q along the ordinate. FIG. 1B is an enlarged graph of FIG. 1A. In FIG. 1B, the number 1 represents an invariant Q rising time.

The invariant Q rising time, as determined under the above conditions, of the polyamide resin composition is preferably 170 seconds or less, more preferably 168 seconds or less, still more preferably 165 seconds or less. The invariant Q rising time of the polyamide resin composition can be controlled to be in this preferred range, for example, by controlling the cooling crystallization temperature of the polyamide resin composition to be in the preferred range described below.

In the polyamide resin composition, the polyamide resin (B) in the polyamide 6 resin (A) preferably has an average diameter of dispersed particle, as observed with a transmission electron microscope, of 500 nm or less, more preferably 400 nm or less, still more preferably 300 nm or less. If the average diameter of dispersed particle of the polyamide resin (B) in the polyamide 6 resin (A) is 500 nm or less, the polyamide resin (B) functions so effectively as a crystallization accelerator that fine and uniform crystals tend to be formed, failure points are unlikely to occur despite repeated charging and discharging of high-pressure hydrogen, and weld properties are improved.

The average diameter of dispersed particle of the polyamide resin (B) is preferably, but not necessarily, at least 1 nm, more preferably at least 5 nm, still more preferably at least 10 nm.

The average diameter of dispersed particle of the polyamide resin (B) can be determined, for example, by cutting an ultrathin section from an extrusion-molded article or an injection-molded article of the polyamide resin composition using an ultramicrotome, staining the ultrathin section, for example, with phosphotungstic acid or ruthenium of an acid value of four, observing the ultrathin section using a model H-7100 transmission electron microscope available from Hitachi, Ltd., and performing image analysis. The image analysis can be carried out using "Scion Image" image analysis software available from Scion Corporation such that average values of major axes and minor axes of particles of the polyamide resin (B) in an electron micrograph are calculated, and the average diameter of dispersed particle is calculated as an average value of the major axes and the minor axes.

Preferably, the average diameter of dispersed particle of the polyamide resin (B) is controlled to be 500 nm or less by melt-kneading the polyamide 6 resin (A) and the polyamide resin (B) at a temperature higher than or equal to the melting points of the resins. By kneading the polyamide 6 resin (A) and the polyamide resin (B) both in a molten state, the polyamide resin (B) can be uniformly dispersed in the polyamide 6 resin (A) at an average diameter of dispersed particle of 500 nm or less. When the polyamide resin (B) is a polyamide 610 resin, the melt-kneading temperature is preferably 230° C. or higher, more preferably 235° C. or higher, most preferably 240° C. or higher. The melt-kneading temperature is preferably up to 300° C., more preferably up to 290° C., most preferably up to 280° C.

The melting point of polyamide resin in the polyamide resin composition is preferably equal to or higher than the melting point of the polyamide 6 resin (A), more preferably higher than the melting point of the polyamide 6 resin (A) by at least 1° C., still more preferably higher than the melting point of the polyamide 6 resin (A) by at least 3° C. The melting point of polyamide resin in the polyamide resin composition is a melting point derived from polyamide resin, as observed when the melting point of the polyamide resin composition is determined. When the melting point of polyamide resin in the polyamide resin composition is equal to or higher than the melting point of the polyamide 6 resin (A) alone, it means that the polyamide resin (B) is uniformly dispersed in the polyamide 6 resin (A). This can further improve the crystallization rate. The melting point of the polyamide resin composition is preferably not higher than the melting point of the polyamide 6 resin (A) +20° C., more preferably not higher than the melting point +15° C., still more preferably not higher than the melting point +10° C. A melting point of the polyamide resin composition not higher than the melting point of the polyamide 6 resin (A) +20° C. can produce the desired effects while maintaining the melt stability of the polyamide resin composition in producing the polyamide resin composition.

The melting point of polyamide resin in the polyamide resin composition can be determined in the same manner as the melting points of the polyamide 6 resin (A) and the polyamide resin (B) are determined by DSC. First, two-point calibration (indium, lead) and baseline subtraction are performed using a differential scanning calorimeter (DSC-7 available from PerkinElmer Inc). A sample in an amount of 8 to 10 mg is heated at a rate of 20° C./min and held for one minute at a temperature 15° C. higher than the temperature at the peak of a melting curve obtained. The sample is then cooled to 30° C. at a rate of 20° C./min and held at 30° C. for one minute, after which a second heating step is carried out at a rate of 20° C./min. The melting endothermic peak temperature of polyamide resin observed during the second heating step is used as the melting point of polyamide resin. When two or more peaks are observed, a temperature corresponding to a higher melting endothermic peak is used as the melting point of polyamide resin in the polyamide resin composition.

The cooling crystallization temperature of the polyamide resin composition is preferably higher than the cooling crystallization temperature of the polyamide 6 resin (A) by at least 1° C., more preferably by at least 3° C., still more preferably by at least 5° C. If the cooling crystallization temperature of the polyamide resin composition is higher than the cooling crystallization temperature of the polyamide 6 resin (A) by at least 1° C., the polyamide resin composition crystallizes faster than the polyamide 6 resin (A) during the process of cooling the polyamide resin composition in a molten state, whereby fine and uniform crystals tend to be formed. The cooling crystallization temperature of the polyamide resin composition is preferably 180° C. or higher, more preferably 183° C. or higher, still more preferably 185° C. or higher. The cooling crystallization temperature of the polyamide resin composition is preferably not higher than the melting point of the polyamide 6 resin (A) +15° C., more preferably not higher than the melting point +12° C., still more preferably not higher than the melting point +10° C. A cooling crystallization temperature of the polyamide resin composition not higher than the melting point of the polyamide 6 resin (A) +15° C. can produce the desired effects while maintaining the melt stability of the polyamide resin composition in producing the polyamide resin composition.

The cooling crystallization temperature of the polyamide resin composition can be determined in the same manner as the cooling crystallization temperatures of the polyamide 6 resin (A) and the polyamide resin (B) are determined by DSC. First, two-point calibration (indium, lead) and baseline subtraction are performed using a differential scanning calorimeter (DSC-7 available from PerkinElmer Inc). A sample in an amount of 8 to 10 mg is heated at a rate of 20° C./min, held for one minute at a temperature 15° C. higher than the temperature at the peak of a melting curve obtained, and then cooled to 30° C. at a rate of 20° C./min. The crystallization exothermic peak temperature observed during this process is used as the cooling crystallization temperature. When two or more peaks are observed, a temperature corresponding to a higher crystallization exothermic peak is used as the cooling crystallization temperature of the polyamide resin composition.

The cooling crystallization temperature of the polyamide resin composition can be controlled to be in the above-described range, for example, by using the preferred polyamide resin composition described above.

A description will now be given of a method of preparing the polyamide resin composition. The thermoplastic polyamide resin composition can be prepared by any method such as kneading the polyamide 6 resin (A), the polyamide resin (B), and, optionally, the impact modifier (C) and other components in a batch; melting the polyamide 6 resin (A) and then kneading the polyamide resin (B) and, optionally, the impact modifier (C) and other components; or melting the polyamide 6 resin (A) and the polyamide resin (B) and then kneading the impact modifier (C) and other components as required. Any known kneading device such as Banbury mixers, rolls, and extruders, can be employed. The impact modifier (C) and other components such as various additives, when added to the polyamide resin composition, can be added at any timing. For example, when the polyamide resin composition is prepared using a twin-screw extruder, the impact modifier (C) and other components may be added at the same time as the polyamide 6 resin (A) and the polyamide resin (B) are added; the impact modifier (C) and other components may be added, for example, by side feeding when the polyamide 6 resin (A) and the polyamide resin (B) are melt kneaded; the impact modifier (C) and other components may be added after the polyamide 6 resin (A) and the polyamide resin (B) are melt kneaded; or the impact modifier (C) and other components may be added to the polyamide 6 resin (A) and melt kneaded before the polyamide resin (B) is added.

The polyamide resin composition can be molded into molded articles by any method. Examples of molding methods include extrusion molding, injection molding, hollow molding, calender molding, compression molding, vacuum molding, foam molding, blow molding, and rotational molding. The shape of molded articles may be, for example, pellet-like, plate-like, fibrous, strand-like, film- or sheet-like, pipe-like, hollow, or box-like.

Having the advantage of being less likely to suffer failure points despite repeated charging and discharging of high-pressure hydrogen, the molded article is used as a molded article exposed to high-pressure hydrogen. The molded article exposed to high-pressure hydrogen is a molded article exposed to hydrogen at a pressure above atmospheric pressure. Being less likely to suffer failure points despite repeated charging and discharging of high-pressure hydrogen, the molded article is used, preferably, as a molded article exposed to hydrogen at a pressure of 20 MPa or higher, more preferably, as a molded article exposed to hydrogen at 30 MPa or higher. The molded article is used, preferably, as a molded article exposed to hydrogen at a pressure of 200 MPa or lower, more preferably, as a molded article exposed to hydrogen at 150 MPa or lower, still more preferably, as a molded article exposed to hydrogen at 100 MPa or lower. Examples of molded articles exposed to high-pressure hydrogen include on-off valves for high-pressure hydrogen, check valves for high-pressure hydrogen, pressure-reducing valves for high-pressure hydrogen, pressure-regulating valves for high-pressure hydrogen, seals for high-pressure hydrogen, hoses for high-pressure hydrogen, tanks for high-pressure hydrogen, tank liners for high-pressure hydrogen, pipes for high-pressure hydrogen, packings for high-pressure hydrogen, pressure sensors for high-pressure hydrogen, pumps for high-pressure hydrogen, tubes for high-pressure hydrogen, regulators for high-pressure hydrogen, films for high-pressure hydrogen, sheets for high-pressure hydrogen, fibers for high-pressure hydrogen, and joints for high-pressure hydrogen. Of these, the molded article is suitable for use for containers and their peripheral components for high-pressure hydrogen such as on-off valves for high-pressure hydrogen, check valves for high-pressure hydrogen, pressure-reducing valves for high-pressure hydrogen, pressure-regulating valves for high-pressure hydrogen, tanks for high-pressure hydrogen, tank liners for high-pressure hydrogen, packings for high-pressure hydrogen, pressure sensors for high-pressure hydrogen, pumps for high-pressure hydrogen, regulators for high-pressure hydrogen, and joints for high-pressure hydrogen. In particular, the molded article is suitable for use for tanks for high-pressure hydrogen.

In a particularly preferred aspect, a tank liner comprising the polyamide resin composition is used as a resin liner of a tank for high-pressure hydrogen, the outside of the resin liner being reinforced with a carbon-fiber-reinforced plastic. That is to say, the tank for high-pressure hydrogen is a tank for high-pressure hydrogen comprising a tank liner comprising the polyamide resin composition and a carbon-fiber-reinforced-plastic (CFRP) reinforcement layer laminated on a surface of the tank liner.

The CFRP reinforcement layer laminated on the surface of the tank liner can advantageously provide strength and elasticity that can withstand high pressure. The CFRP reinforcement layer is made of carbon fibers and a matrix resin. The single-fiber tensile modulus of the carbon fibers is preferably 50 to 700 GPa in view of flexural properties and strength, more preferably 200 to 700 GPa in view also of specific rigidity, most preferably 200 to 450 GPa in view also of cost-effectiveness. The single-fiber tensile strength of the carbon fibers is preferably 1,500 to 7,000 MPa, more preferably 3,000 to 7,000 MPa in view of specific strength. The density of the carbon fibers is preferably 1.60 to 3.00, more preferably 1.70 to 2.00 in view of weight saving, most preferably 1.70 to 1.90 in view of cost-effectiveness. Furthermore, the single-fiber diameter of the carbon fibers is preferably 5 to 30 µm, more preferably 5 to 20 µm in view of handleability, most preferably 5 to 10 µm in view also of weight saving. The carbon fibers may be used alone or in combination with reinforcing fibers other than carbon fibers. Examples of reinforcing fibers other than carbon fibers include glass fibers and aramid fibers. With regard to the ratio of the carbon fibers to the matrix resin, the volume fraction Vf of the carbon fibers in the carbon-fiber-reinforced-plastic layer material is preferably 20% to 90% in view of rigidity, preferably 40% to 80% in view of productivity and required rigidity.

The matrix resin of the CFRP reinforcement layer may be a thermosetting resin or a thermoplastic resin. When the matrix resin is a thermosetting resin, examples of base resins include epoxy resins, unsaturated polyester resins, vinyl ester resins, phenolic resins, polyurethane resins, and silicone resins. These may be used alone or as a mixture of two or more. Epoxy resins are particularly preferred. Examples of epoxy resins include bisphenol A epoxy resins, bisphenol F epoxy resins, bisphenol S epoxy resins, phenol novolac epoxy resins, and isocyanate-modified bisphenol A epoxy resins. When a thermosetting resin is used as a matrix resin, appropriate curing agents and reaction accelerators can be added to the thermosetting resin component.

When the matrix resin is a thermoplastic resin, examples of base resins include polyethylene resins, polypropylene resins, polyvinyl chloride resins, ABS resins, polystyrene resins, AS resins, polyamide resins, polyacetal resins, polycarbonate resins, thermoplastic polyester resins, PPS resins, fluorocarbon resins, polyetherimide resins, polyether ketone resins, and polyimide resins. These thermoplastic resins may be used alone, as a mixture of two or more, or as a copolymer. In a mixture, compatibilizers may be used in combination. Furthermore, flame retardants such as brominated flame retardants, silicon-based flame retardants, and red phosphorus, may be added.

The CFRP reinforcement layer may be laminated on the surface of the tank liner for high-pressure hydrogen by a known method such as a filament winding (hereinafter referred to as FW) method, a tape winding (hereinafter referred to as TW) method, a sheet winding (hereinafter referred to as SW) method, a hand lay-up method, or an RTM method. Of these molding methods, a single method may be used alone, or two or more methods may be used in combination. In view of expression of properties, productivity, and moldability, methods selected from the FW method, the TW method, and the SW method are preferred. The FW method, the SW method, and the TW method, which are basically the same molding methods in that stranded carbon fibers provided with a matrix resin are laminated on a liner, have different names according to the form in which the carbon fibers are wound around the liner: the form of a filament (yarn), the form of a tape (formed by bundling the yarns to some extent), and the form of a sheet (formed by bundling the tapes to some extent). Although a detailed description will be given with reference to the FW method, which is most basic, the description can be applied also to the TW method and the SW method.

When the matrix resin in the FW method is a thermosetting resin, carbon fibers with the resin pre-applied (uncured) can be wound directly around the liner, or the resin can be applied to the carbon fibers immediately before the fibers are wound around the liner. In these cases, after the carbon fibers and the uncured matrix resin are wound around the liner, it is necessary to perform a resin-curing treatment under conditions suitable for the resin used, for example, in a batch furnace (oven) or a continuous curing furnace so as to cure the resin.

When the matrix resin in the FW method is a thermoplastic resin, carbon fibers with the resin pre-applied (impregnated) can be wound directly around the liner into a shape of a tank for high-pressure hydrogen. In this case, it is necessary to heat the carbon fibers with the resin applied to the melting point of the thermoplastic resin or higher immediately before the fibers are wound around the liner. Alternatively, a molten thermoplastic resin can be applied to the carbon fibers immediately before the fibers are wound around the liner. In this case, the resin-curing step, as performed in the case of a thermosetting resin, is unnecessary.

When the tank for high-pressure hydrogen is produced by the FW method, the TW method, or the SW method described above, the most important thing is the design of fiber orientation of carbon fibers. In the FW method, the TW method, and the SW method, molding is carried out by winding, for example, carbon fiber strands (continuous fibers) or a prepreg obtained by impregnating carbon fiber strands with a resin, around a liner. Construction is preferably carried out such that design factors including the direction of the continuous fibers at the middle of the liner and the lamination thickness are designed to achieve the rigidity and strength satisfying required properties.

In the tank for high-pressure hydrogen, a valve is preferably inserted into the tank liner by insert molding. Integrating the valve with the tank liner by insert molding is preferred to increase high-pressure hydrogen tightness. The valve serves as a charging/discharging port for high-pressure hydrogen. Examples of the material of the metal part for use as the valve include carbon steels, manganese steels, chromium-molybdenum steels, stainless steels, and aluminum alloys. Examples of carbon steels include carbon steel pipes for pressure piping, carbon steel pipes for high-pressure piping, steel pipes for low-temperature piping, and carbon steels for machine structural use. Examples of manganese steels include seamless steel pipes for high-pressure gas containers, manganese steels for machine structural use, and chromium-manganese steels. Examples of chromium-molybdenum steels and low-alloy steels include seamless steel pipes for high-pressure gas containers, alloy steel pipes for machine structural use, nickel-chromium-molybdenum steels, and chromium-molybdenum steels. Examples of stainless steels include pressure stainless steel forgings, stainless steel pipes for piping, stainless steel bars, hot-rolled stainless steel sheets and strips in coil, and cold-rolled stainless steel sheets and strips in coil. Examples of aluminum alloys include sheets, strips, bars, wires, seamless pipes, and forgings of aluminum and aluminum alloys. Carbon steels may be annealed or normalized. Manganese steels may be normalized, or quenched and tempered. Chromium-molybdenum steels and low-alloy steels may be quenched and tempered. Stainless steels may be subjected to a solution treatment. Aluminum alloys may be quenched and tempered. Furthermore, aluminum alloys may be subjected to a solution treatment and a T6 aging treatment.

The tank for high-pressure hydrogen most preferably comprises a tank liner comprising the polyamide resin composition and a CFRP reinforcement layer laminated on a surface of the tank liner, and further comprises a valve inserted into the tank liner.

EXAMPLES

Our compositions and molded articles will now be described in more detail with reference to examples. The examples below are not intended to limit this disclosure.

Evaluations in Examples and Comparative Examples were conducted by the following methods.

(1) Resistance to Repeated Charging and Discharging of High-Pressure Hydrogen

Using each of the pellets obtained in Examples and Comparative Examples, cylindrical test pieces having a diameter of 29 mm and a height of 12.6 mm were injection molded with an "SU75DUZ-C250" injection molding machine available from Sumitomo Heavy Industries, Ltd. under the following molding conditions: cylinder temperature, 240° C.; mold temperature, 80° C.; injection speed, 10 mm/sec; holding pressure, 15 MPa; pressure-holding time, 15 seconds; cooling time, 15 seconds.

The test pieces obtained were subjected to X-ray CT analysis using "TDM1000-IS" available from Yamato Scientific Co., Ltd. to check the presence of failure points. A test piece having no failure point was placed in an autoclave, and then hydrogen gas was fed into the autoclave over three minutes to a pressure of 30 MPa. The pressure was held for 2 hours and then reduced to atmospheric pressure over one minute. This cycle was repeated 700 times. The test piece after 700 cycles was subjected to X-ray CT analysis using "TDM1000-IS" available from Yamato Scientific Co., Ltd. to check the presence of failure points of 10 μm or larger.

(2) Melting Point and Cooling Crystallization Temperature

For each of the pellets obtained in Examples and Comparative Examples, two-point calibration (indium, lead) and baseline subtraction were performed using a differential scanning calorimeter (DSC-7 available from PerkinElmer Inc). After that, a sample in an amount of 8 to 10 mg was heated at a rate of 20° C./min, held for one minute at a temperature 15° C. higher than the temperature at the peak of a melting curve obtained, and then cooled to 30° C. at a rate of 20° C./min. The crystallization exothermic peak temperature observed during the cooling step was used as a cooling crystallization temperature. After the sample was held at 30° C. for one minute, a second heating step was performed at a rate of 20° C./min. The melting endothermic peak temperature observed during the second heating step was used as a melting point. Also for the polyamide 6 resin (A) and the polyamide resin (B) used in Examples and Comparative Examples, the cooling crystallization temperature and the melting point were determined in the same manner.

(3) Invariant Q Rising Time Determined by Light Scattering Measurements

Each of the pellets obtained in Examples and Comparative Examples in an amount of 8 to 10 mg was placed on a "CSS-450W" hot stage available from Linkam Scientific Instruments Ltd. with a coverslip thereon, and the temperature was held at 250° C. for 30 seconds to melt the sample. The temperature was then lowered to 180° C. at a rate of 20° C./min. During this process, the invariant Q rising time was determined using a "DYNA-3000" polymer film dynamic analyzer available from Otsuka Electronics Co., Ltd. under the following conditions: mode, one-dimensional scanning (1×512); X direction, four elements at the central part are integrated and counted as one data; ND filter, 5%; measurement interval, 1 sec; exposure time, 500 msec; goniometer angle, 20°; provided that the time point at the start of cooling was taken as 0.

(4) Heat Cycle Resistance

Each of the pellets obtained in Examples and Comparative Examples was overmolded at a thickness of 1.5 mm on a metal core of 47 mm×47 mm×27 mm using a "NEX1000" injection molding machine available from Nissei Plastic Industrial Co., Ltd. under the following molding conditions: cylinder temperature, 240° C.; mold temperature, 80° C.; injection speed, 100 mm/sec; cooling time, 20 seconds.

Three of the metal/resin composite molded articles obtained were allowed to stand at −60° C. for one hour and then at 90° C. for one hour. The resulting composite molded articles were visually observed to check the presence of cracks. This cycle was repeated, and the number of cycles until all of the three composite molded articles were cracked was determined and evaluated as follows: 500 cycles or more, A; 200 to 499 cycles, B; 199 cycles or less, C.

(5) Weld Properties

Using each of the pellets obtained in Examples and Comparative Examples, double-gated ASTM Type 1 weld dumbbell test pieces (165 mm×19 mm×3.2 mm) were injection molded with an "SE75DUZ-C250" injection molding machine available from Sumitomo Heavy Industries, Ltd. under the following molding conditions: cylinder temperature, 240° C.; mold temperature, 80° C.; injection speed, 40 mm/sec; holding pressure, 20 MPa; cooling time, 20 seconds.

Five of the weld dumbbell test pieces obtained were subjected to a tensile test at a rate of 10 mm/min to cause base material fracture, that is, the number of test pieces fractured at portions other than the weld was counted. Larger numbers of test pieces that underwent base material fracture indicate more excellent weld tensile properties.

(6) Average Diameter of Dispersed Particle of Crystallization Accelerator in Polyamide 6 Resin (A)

An ultrathin section was cut from each of the pellets obtained in Examples and Comparative Examples using an ultramicrotome, and the ultrathin section was stained with phosphotungstic acid and then observed at a magnification of 35,000× using a model H-7100 transmission electron microscope available from Hitachi, Ltd. The average diameter of dispersed particle of a crystallization accelerator was determined by image analysis. The image analysis was carried out using "Scion Image" image analysis software available from Scion Corporation such that average values of major axes and minor axes of particles of the crystallization accelerator in an electron micrograph were calculated, and the average diameter of dispersed particle was calculated as an average value of the major axes and the minor axes. The crystallization accelerator means the polyamide resin (B) (Examples), PA66 (Comparative Example 2), an organic nucleating agent (Comparative Examples 3 and 4), an inorganic nucleating agent (Comparative Examples 5, 6, and 12), PA610 (Comparative Examples 7, 8, and 10), PA6/66 copolymer (Comparative Example 9), and PA46 (Comparative Example 11).

Materials used in Examples and Comparative Examples and abbreviations thereof are described below.

PA6: polyamide 6 resin (melting point: 223° C., cooling crystallization temperature: 175° C., relative viscosity determined at 25° C. in a 98% concentrated sulfuric acid solution at a resin concentration of 0.01 g/ml: 2.70, invariant Q rising time: 175 sec)

PA66: polyamide 66 resin (melting point: 263° C., cooling crystallization temperature: 225° C., relative viscosity determined at 25° C. in a 98% concentrated sulfuric acid solution at a resin concentration of 0.01 g/ml: 2.70)

PA610: polyamide 610 resin (melting point: 226° C., cooling crystallization temperature: 187° C., relative viscosity determined at 25° C. in a 98% concentrated sulfuric acid solution at a resin concentration of 0.01 g/ml: 3.50)

PA46: polyamide 46 resin (melting point: 290° C., cooling crystallization temperature: 257° C., relative viscosity determined at 25° C. in a 98% concentrated sulfuric acid solution at a resin concentration of 0.01 g/ml: 3.20)

PA6/PA410 copolymer: polyamide 6/polyamide 410 copolymer (melting point: 232° C., cooling crystallization temperature: 194° C., relative viscosity determined at 25° C. in a 98% concentrated sulfuric acid solution at a resin concentration of 0.01 g/ml: 3.50)

PA6/PA66 copolymer: polyamide 6/polyamide 66 copolymer (melting point: 190° C., cooling crystallization temperature: 122° C., relative viscosity determined at 25° C. in a 98% concentrated sulfuric acid solution at a resin concentration of 0.01 g/ml: 4.20)

Organic nucleating agent: N,N',N"-tris(2-methylcyclohexan-1-yl)propane-1-2-3 triylcarboxamide "RIKA-CLEAR" (registered trademark) PC-1 (New Japan Chemical Co., Ltd.)

Inorganic nucleating agent 1: talc "MICROACE" (registered trademark) P-6 (Nippon Talc Co., Ltd., median diameter (D50): 4.0 μm)

Inorganic nucleating agent 2: microtalc "NANOACE" (registered trademark) D-600 (Nippon Talc Co., Ltd., median diameter (D50): 0.5 μm)

Impact modifier 1: maleic anhydride-modified ethylene/1-butene copolymer "TAFMER" (registered trademark) MH7020 (Mitsui Chemicals, Inc.)

Impact modifier 2: glycidyl methacrylate-modified polyethylene copolymer "BONDFAST" (registered trademark) 7L (Sumitomo Chemical Co., Ltd.)

Impact modifier 3: ionomer "HIMIRAN" (registered trademark) 1706" (Du Pont)

Examples 1 to 9 and Comparative Examples 1 to 12

A twin-screw extruder (TEX30α-35BW-7V available from JSW) (L/D=45, wherein L is a distance from a feed port to a discharge port) was set to a cylinder temperature of 240° C., a screw arrangement including one kneading zone, and a screw speed of 150 rpm. Raw materials shown in Tables 1 and 2 were fed into the extruder and melt kneaded. A gut discharged through a die at a speed of 20 kg/h was rapidly cooled by being passed through a cooling bath filled with water conditioned at 10° C. over 10 seconds, and then pelletized with a strand cutter to give pellets. The pellets obtained were vacuum dried in a vacuum dryer at 80° C. for 12 hours, and the dried pellets evaluated by the above-described methods. The results are shown in Tables 1 and 2. The invariant Q rising time in Example 4 determined by light scattering measurements is shown in FIGS. 1A and 1B.

TABLE 1

|  |  |  | Example 1 | Example 2 | Example 3 | Example 4 |
|---|---|---|---|---|---|---|
| Composition | PA6 | Parts by weight | 100 | 100 | 100 | 100 |
|  | PA610 | Parts by weight | 0.01 | 0.1 | 1 | 3 |
|  | PA6/PA410 copolymer | Parts by weight | — | — | — | — |
|  | Impact modifier 1 | Parts by weight | — | — | — | — |
|  | Impact modifier 2 | Parts by weight | — | — | — | — |
|  | Impact modifier 3 | Parts by weight | — | — | — | — |
| Evaluation results | Failure point | — | No | No | No | No |
|  | Melting point of polyamide resin composition | ° C. | 225 | 226 | 227 | 229 |
|  | Cooling crystallization temperature of polyamide resin composition | ° C. | 180 | 182 | 184 | 187 |
|  | Invariant Q rising time | sec | 170 | 169 | 168 | 163 |
|  | Heat cycle resistance | — | C | C | C | C |
|  | Tensile properties of weld dumbbell test piece | — | 3/5 | 4/5 | 4/5 | 5/5 |
|  | Average diameter of dispersed particle of crystallization accelerator | nm | 165 | 172 | 187 | 225 |

|  |  | Example 5 | Example 6 | Example 7 | Example 8 | Example 9 |
|---|---|---|---|---|---|---|
| Composition | PA6 | 100 | 100 | 100 | 100 | 100 |
|  | PA610 | — | 5 | 3 | 3 | 3 |
|  | PA6/PA410 copolymer | 3 | — | — | — | — |
|  | Impact modifier 1 | — | — | 11 | — | — |
|  | Impact modifier 2 | — | — | — | 11 | — |
|  | Impact modifier 3 | — | — | — | — | 11 |
| Evaluation results | Failure point | No | No | No | No | No |
|  | Melting point of polyamide resin composition | 230 | 226 | 228 | 227 | 226 |
|  | Cooling crystallization temperature of polyamide resin composition | 185 | 181 | 185 | 184 | 183 |
|  | Invariant Q rising time | 167 | 170 | 164 | 166 | 166 |
|  | Heat cycle resistance | C | C | A | B | B |
|  | Tensile properties of weld dumbbell test piece | 4/5 | 3/5 | 5/5 | 4/5 | 4/5 |

TABLE 1-continued

| | | | | | |
|---|---|---|---|---|---|
| Average diameter of dispersed particle of crystallization accelerator | 264 | 340 | 206 | 210 | 212 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Composition | PA6 | Parts by weight | 100 | 100 | 100 | 100 | 100 | 100 |
| | PA66 | Parts by weight | — | 3 | — | — | — | — |
| | PA610 | Parts by weight | — | — | — | — | — | — |
| | PA46 | Parts by weight | — | — | — | — | — | — |
| | PA6/PA66 copolymer | Parts by weight | — | — | — | — | — | — |
| | Organic nucleating agent | Parts by weight | — | — | 0.1 | 3 | — | — |
| | Inorganic nucleating agent 1 | Parts by weight | — | — | — | — | 0.1 | 3 |
| | Inorganic nucleating agent 2 | Parts by weight | — | — | — | — | — | — |
| | Impact modifier 1 | Parts by weight | — | — | — | — | — | — |
| | Impact modifier 3 | Parts by weight | — | — | — | — | — | — |
| Evaluation results | Failure point | — | — | Yes | Yes | Yes | Yes | Yes | Yes |
| | Melting point of polyamide resin composition | °C. | 223 | 223 | 224 | 225 | 224 | 225 |
| | Cooling crystallization temperature of polyamide resin composition | °C. | 175 | 178 | 177 | 179 | 180 | 183 |
| | Invariant Q rising time | sec | 175 | 173 | 173 | 173 | 167 | 168 |
| | Heat cycle resistance | — | C | C | C | C | C | C |
| | Tensile properties of weld dumbbell test piece | % | 2/5 | 2/5 | 1/5 | 1/5 | 0/5 | 0/5 |
| | Average diameter of dispersed particle of crystallization accelerator | nm | — | 710 | 545 | 622 | 3750 | 5120 |

| | | | Comparative Example 7 | Comparative Example 8 | Comparative Example 9 | Comparative Example 10 | Comparative Example 11 | Comparative Example 12 |
|---|---|---|---|---|---|---|---|---|
| Composition | PA6 | | 100 | 100 | 100 | 100 | 100 | 100 |
| | PA66 | | — | — | — | — | — | — |
| | PA610 | | 0.001 | 10 | — | 33 | — | — |
| | PA46 | | — | — | — | — | 3 | — |
| | PA6/PA66 copolymer | | — | — | 32 | — | — | — |
| | Organic nucleating agent | | — | — | — | — | — | — |
| | Inorganic nucleating agent 1 | | — | — | — | — | — | — |
| | Inorganic nucleating agent 2 | | — | — | — | — | — | 3 |
| | Impact modifier 1 | | — | — | 28 | 17 | 11 | 11 |
| | Impact modifier 3 | | — | — | — | 17 | — | — |
| Evaluation results | Failure point | | Yes | Yes | Yes | Yes | Yes | Yes |
| | Melting point of polyamide resin composition | | 224 | 225 | 222 | 225 | 225 | 225 |
| | Cooling crystallization temperature of polyamide resin composition | | 175 | 176 | 124 | 173 | 177 | 185 |
| | Invariant Q rising time | | 174 | 173 | 190 | 174 | 173 | 167 |
| | Heat cycle resistance | | C | C | B | B | B | B |
| | Tensile properties of weld dumbbell test piece | | 2/5 | 2/5 | 0/5 | 0/5 | 0/5 | 0/5 |
| | Average diameter of dispersed particle of crystallization accelerator | | 155 | 525 | — | 780 | 808 | 932 |

The results showed that a polyamide resin composition comprising a polyamide 6 resin (A) and a polyamide resin (B) crystallizes fast, and a molded article made of the polyamide resin composition is less likely to suffer failure points despite repeated charging and discharging of high-pressure hydrogen and has excellent weld properties.

The results further showed that a molded article made of a polyamide resin composition comprising an impact modifier (C) has high heat cycle resistance.

INDUSTRIAL APPLICABILITY

The polyamide resin composition crystallizes fast and can provide a molded article less likely to suffer failure points despite repeated charging and discharging of high-pressure hydrogen and further having excellent weld properties, which are important mechanical properties of injection-molded articles. Having these properties, the molded article made of the polyamide resin composition can be widely used as a molded article exposed to high-pressure hydrogen.

The invention claimed is:

1. A polyamide resin composition for a molded article exposed to high-pressure hydrogen, the composition comprising:
   a polyamide 6 resin (A);
   a polyamide resin (B) having a melting point, as determined by DSC, that is not higher than a melting point of the polyamide 6 resin (A) +20° C. and a cooling crystallization temperature of the polyamide resin (B), as determined by DSC, that is higher than a cooling crystallization temperature of the polyamide 6 resin (A),
   the polyamide resin (B) present in an amount of 0.01 to 5 parts by weight based on 100 parts by weight of the polyamide 6 resin (A); and
   an impact modifier (C) in an amount of 1 to 50 parts by weight based on 100 parts by weight of the polyamide 6 resin (A).

2. The polyamide resin composition according to claim 1, wherein the polyamide resin (B) is a polyamide 610 resin.

3. The polyamide resin composition according to claim 1, wherein the impact modifier (C) comprises an ethylene/α-olefin copolymer modified with an unsaturated carboxylic acid and/or a derivative thereof.

4. The polyamide resin composition according to claim 1, wherein the polyamide resin composition has an invariant Q rising time shorter than an invariant Q rising time of the polyamide 6 resin (A), the invariant Q rising times determined by light scattering measurements by cooling from 250° C. at a rate of 20° C./min.

5. The polyamide resin composition according to claim 1, wherein the polyamide resin (B) in the polyamide 6 resin (A) has an average diameter of dispersed particle, as observed with a transmission electron microscope, of 500 nm or less.

6. A molded article exposed to high-pressure hydrogen, the article comprising the polyamide resin composition according to claim 1.

7. A tank liner for high-pressure hydrogen, the tank liner comprising the polyamide resin composition according to claim 1.

8. A tank for high-pressure hydrogen comprising:
   a tank liner comprising the polyamide resin composition according to claim 1; and
   a carbon-fiber-reinforced-plastic reinforcement layer laminated on a surface of the tank liner.

9. The tank according to claim 8, further comprising a valve inserted into the tank liner.

* * * * *